(12) United States Patent
Agari et al.

(10) Patent No.: US 7,579,817 B2
(45) Date of Patent: Aug. 25, 2009

(54) CONSTANT-VOLTAGE CIRCUIT CAPABLE OF REDUCING TIME REQUIRED FOR STARTING, SEMICONDUCTOR APPARATUS INCLUDING CONSTANT-VOLTAGE CIRCUIT, AND CONTROL METHOD OF CONSTANT-VOLTAGE CIRCUIT

(75) Inventors: Hideki Agari, Osaka-fu (JP); Yohichi Sakai, Osaka-fu (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/408,028

(22) Filed: Apr. 21, 2006

(65) Prior Publication Data

US 2006/0238178 A1    Oct. 26, 2006

(30) Foreign Application Priority Data

Apr. 21, 2005   (JP) .............................. 2005-123696

(51) Int. Cl.
G05F 1/00 (2006.01)
G05F 3/16 (2006.01)

(52) U.S. Cl. ........................ 323/282; 323/224; 323/238

(58) Field of Classification Search ......... 323/222–225, 323/282–287, 268, 238
See application file for complete search history.

(56) References Cited

U.S. PATENT DOCUMENTS

| | | | | |
|---|---|---|---|---|
| 4,806,842 A * | 2/1989 | Bittner | ........................ | 323/222 |
| 4,940,929 A * | 7/1990 | Williams | .................... | 323/222 |
| 4,959,606 A * | 9/1990 | Forge | ........................... | 323/286 |
| 5,592,072 A * | 1/1997 | Brown | ........................ | 323/268 |
| 5,726,845 A * | 3/1998 | Ho | ............................... | 361/86 |
| 5,747,976 A * | 5/1998 | Wong et al. | .................. | 323/282 |
| 5,777,462 A * | 7/1998 | Yue | ............................. | 323/285 |
| 5,861,735 A * | 1/1999 | Uchida | ....................... | 323/271 |
| 6,100,678 A * | 8/2000 | Hobrecht | .................... | 323/288 |
| 7,106,031 B2 * | 9/2006 | Hayakawa et al. | .......... | 323/224 |
| 2004/0174149 A1 | 9/2004 | Agari et al. | | |
| 2005/0052171 A1 * | 3/2005 | Horimoto | .................... | 323/282 |
| 2005/0231180 A1 * | 10/2005 | Nagata et al. | ................ | 323/268 |

FOREIGN PATENT DOCUMENTS

| | | |
|---|---|---|
| JP | 2003-079133 | 3/2003 |
| JP | 2003-216247 | 7/2003 |
| JP | 2003-324939 | 11/2003 |

* cited by examiner

Primary Examiner—Akm E Ullah
Assistant Examiner—M'Baye Diao
(74) Attorney, Agent, or Firm—Dickstein Shapiro LLP (57) ABSTRACT

A constant-voltage circuit includes a switching regulator and a series regulator each configured to start operating according to a selection signal input from outside the integrated circuit for exclusively causing one of the switching or the series regulators to operate, convert an input voltage to a rated voltage and to output the voltage to an output terminal. The switching regulator performs a soft-start operation for raising an output voltage to the rated voltage at a constant speed when starting operation. The series regulator regulates a current so that an output current does not exceed a predetermined value, simultaneously starts operating when the switching regulator starts operating, and automatically stops outputting a current to the output terminal when the soft-start operation is completed. A semiconductor apparatus provided with a predetermined function includes the constant-voltage circuit. A control method controls the constant-voltage circuit.

13 Claims, 4 Drawing Sheets

FIG. 4

CONSTANT-VOLTAGE CIRCUIT CAPABLE OF REDUCING TIME REQUIRED FOR STARTING, SEMICONDUCTOR APPARATUS INCLUDING CONSTANT-VOLTAGE CIRCUIT, AND CONTROL METHOD OF CONSTANT-VOLTAGE CIRCUIT

CROSS-REFERENCE TO RELATED APPLICATIONS

This application is based on and claims priority to Japanese patent application, No. 2005-123696 filed on Apr. 21, 2005, in the Japan Patent Office, the entire contents of which are incorporated by reference herein.

BACKGROUND OF THE INVENTION

1. Field of Invention

The present invention relates to a constant-voltage circuit, a semiconductor apparatus including the constant-voltage circuit, a method of controlling the constant-voltage circuit, and more particularly to a constant-voltage circuit including a soft-start function capable of reducing time required for starting a semiconductor apparatus including the constant-voltage circuit, and a method of controlling the constant-voltage circuit.

2. Discussion of the Background

Recently, in consideration of an environmental issue, there has been demand for electronic equipment consuming less electricity. Such an energy saving trend is particularly noticeable in a field of battery-driven electronic equipment. An important point in a general way of saving power is to achieve a reduction in electricity consumed by electronic equipment, and an improvement in efficiency of a power supply circuit to cut unnecessary consumption of electricity. A general method of reducing electricity consumption of electronic equipment is to keep the electronic equipment in a stand-by state while the electronic equipment is not operating so that operation of a circuit therein is stopped to cut electricity consumption. However, bringing the electronic equipment into the stand-by state may not achieve satisfactory electricity savings when the power supply circuit is not efficient.

General power supply circuits used in electronic equipment include a switching regulator and a series regulator.

Although the switching regulator is highly efficient with a rated load, the switching regulator has a large output voltage ripple and a large operating noise, and internally consumes a relatively large amount of electricity. Therefore, the switching regulator significantly impairs the efficiency under a light load with a small output current. Further, the switching regulator requires a relatively long time for a rise of an output voltage after the power is turned on, and takes a relatively long time for responding to shifts in an input voltage and a load. Therefore, the switching regulator is defective in that the switching regulator has low stability of an output voltage.

On the other hand, although the series regulator has low efficiency with a large amount of load current, as an output transistor consumes a large amount of electricity, the series regulator also has a small output voltage ripple and small operating noise, and a power supply control circuit internally consumes a small amount of electricity. Therefore, the series regulator may achieve higher efficiency than the switching regulator with a small amount of load current. Further, it is easy in the series regulator to reduce amounts of time required for a rise of an output voltage and for responding to shifts in an input voltage and a load. Further, the series regulator has a high stability output voltage.

For the above reason, a background power supply circuit includes both a switching regulator and a series regulator, and selectively uses one of the switching and series regulators according to electricity consumption so as to improve efficiency of a constant-voltage circuit.

Figure 1:
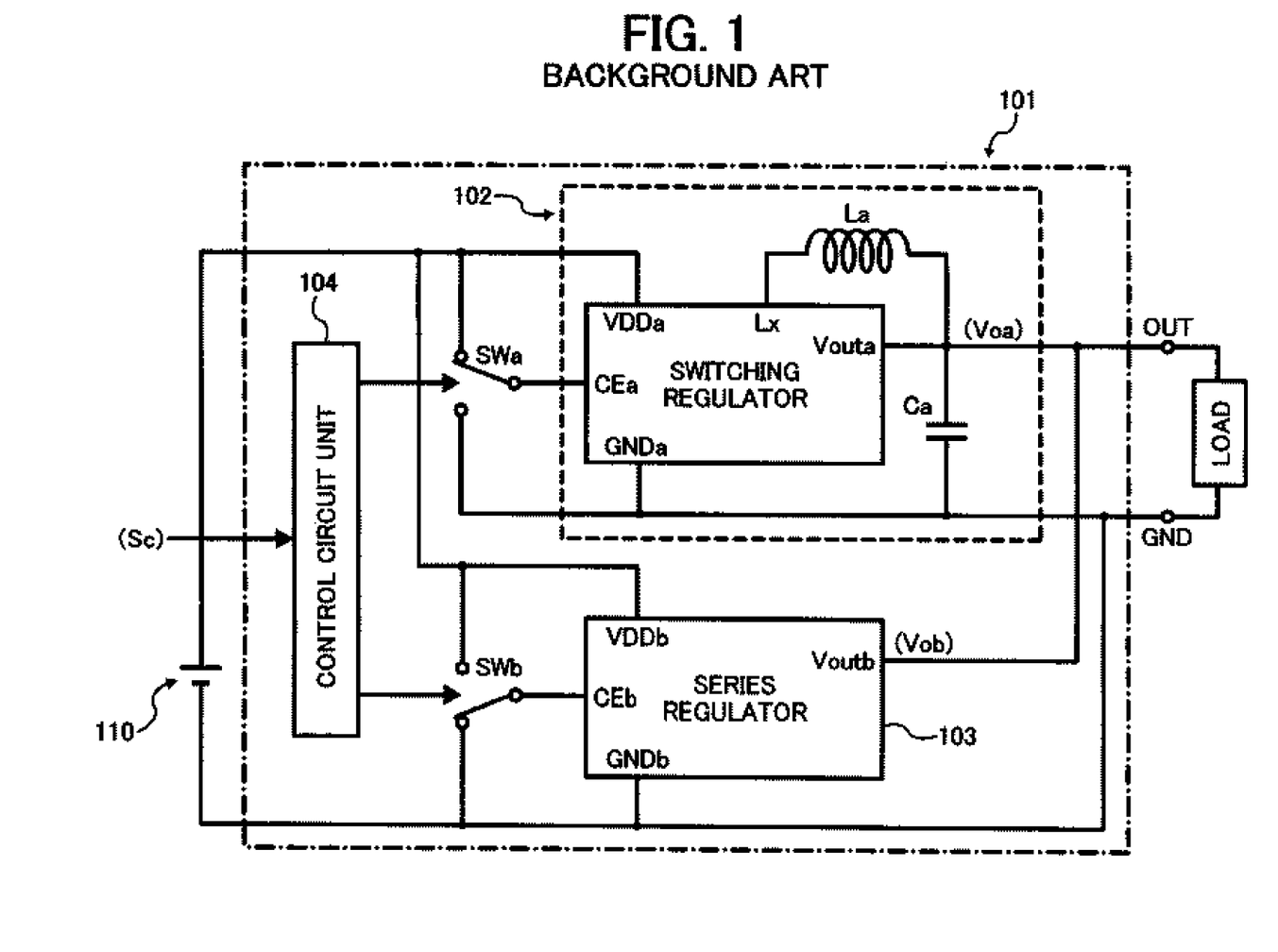
FIG. 1 is a diagram illustrating a configuration of a background constant-voltage circuit.

FIG. 1 illustrates a diagram of a configuration of a constant-voltage circuit in accordance with an exemplary embodiment of the invention. As shown in FIG. 1, a constant-voltage circuit 101 includes a switching regulator 102, a series regulator 103, and a control circuit unit 104. The switching regulator 102 and the series regulator 103 convert voltages input from a direct current power supply 110 to respective voltages Voa, Vob. The control circuit unit 104 controls a switching operation for switching between the switching regulator 102 and the series regulator 103 so as to selectively operate either the switching regulator 102 or the series regulator 103 according to an external switch control signal Sc. When controlling the switching operation, the control circuit unit 104 first causes both the switching regulator 102 and the series regulator 103 to operate, and then causes a desired one of the switching regulator 102 or series regulator 103 to continue operating.

On the other hand, a general switching regulator includes a soft-start circuit for gradually raising an output voltage so that an excessive current does not flow into a switching transistor on startup. In one example, the soft-start circuit gradually increases a reference voltage; and in another example, the soft-start circuit uses a D/A converter to gradually increase a reference voltage.

BRIEF SUMMARY OF THE INVENTION

An exemplary embodiment of the invention provides a constant-voltage circuit having a switching regulator including a function for performing a soft-start operation for raising an output voltage to a rated voltage at a constant speed when starting an operation. The switching regulator is configured to start operating according to a selection signal, convert an input voltage to the rated voltage and, output the voltage to an output terminal. The constant voltage circuit also includes a series regulator including a function for regulating a current so that an output current does not exceed a predetermined value. The series regulator is configured to start operating according to the selection signal, convert the input voltage to the rated voltage and, output the voltage to the output terminal. The series regulator simultaneously starts operating when the switching regulator starts operating, and automatically stops outputting a current to the output terminal when the soft-start operation of the switching regulator is completed. The selection signal is input from outside the integrated circuit for exclusively causing either the switching regulator or the series regulator to operate.

Another exemplary embodiment of the invention provides a semiconductor apparatus having a predetermined function, including a constant-voltage circuit which includes a switching regulator including a function for performing a soft-start operation for raising an output voltage to a rated voltage at a constant speed when starting operation. The switching regulator is configured to start operating according to a selection signal, convert an input voltage to the rated voltage and output the voltage to an output terminal. The constant-voltage circuit also includes a series regulator including a function for regulating a current so that an output current does not exceed a predetermined value. The series regulator is configured to start operating according to the selection signal, convert the input voltage to the rated voltage and output the voltage to an output terminal. The series regulator simultaneously starts operating when the switching regulator starts operating, and automatically stops outputting a current when the soft-start operation of the switching regulator is completed. The selection signal is input from outside the integrated circuit for exclusively causing either the switching regulator or the series regulator to operate.

An exemplary method of the invention includes controlling a constant-voltage circuit having a function of performing a soft-start operation, which includes the steps of providing a switching regulator that includes the function of performing the soft-start operation, providing a series regulator, receiving a selection signal from outside the circuit for exclusively causing either the switching regulator or the series regulator to operate, activating simultaneously the series regulator when the switching regulator starts operating, and causing the series regulator to automatically stop outputting a current to an output terminal when the soft-start operation of the switching regulator is completed.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE INVENTION

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, a constant-voltage circuit according to a preferred embodiment of the present invention is described.

Figure 2:
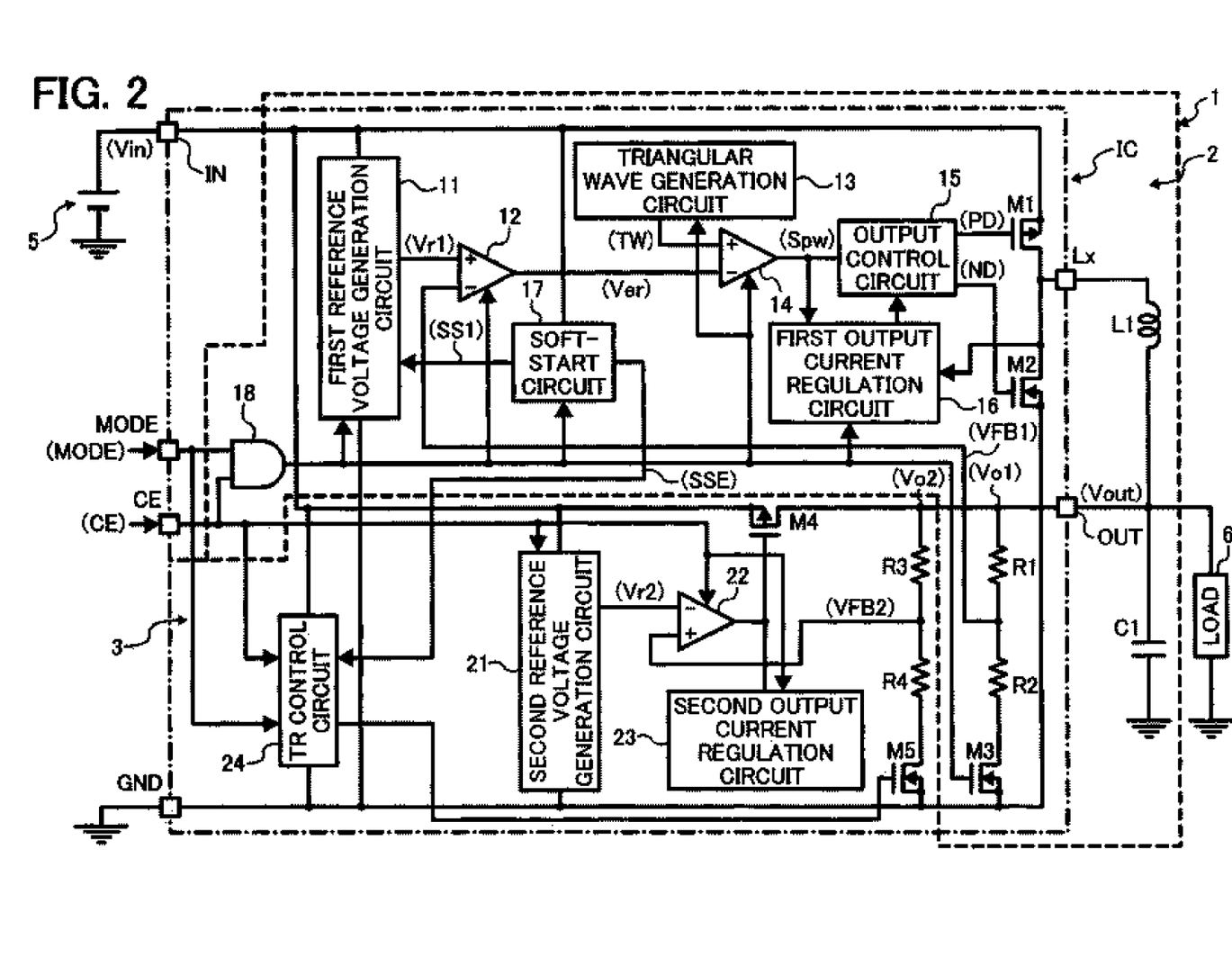
FIG. 2 is a diagram illustrating a configuration of a constant-voltage circuit according to an exemplary embodiment of the present invention.

Referring to FIG. 2, a constant-voltage circuit 1 includes a switching regulator 2 and a series regulator 3.

The switching regulator 2 includes a smoothing circuit unit and a switching control circuit unit. The switching regulator 2 further includes a switching transistor M1, a resistor R1, a resistor R2, a NMOS transistor M3, and an AND circuit 18. The smoothing circuit unit includes a switching transistor M2, a smoothing inductor L1, and a condenser C1. The switching control circuit unit includes a first reference voltage generation circuit 11, a first error amplification circuit 12, a triangular wave generation circuit 13, a PWM comparison circuit 14, an output control circuit 15, a first output current regulation circuit 16, and a soft-start circuit 17.

The series regulator 3 includes an output voltage detection circuit unit and a control circuit unit. The series regulator 3 further includes a second reference voltage generation circuit 21, a second error amplification circuit 22, and a second output current regulation circuit 23. The output voltage detection circuit unit includes a resistor R3, a resistor R4, an output transistor M4, and a NMOS transistor M5. The control circuit unit includes a TR control circuit 24.

Next, a function of each component of the constant-voltage circuit 1 is described below.

The constant-voltage circuit 1 converts an input voltage Vin input to an input terminal IN from a direct current (DC) power source 5 such as a battery to a predetermined constant voltage to output from an output terminal OUT as an output voltage Vout. The output terminal OUT is connected to a ground voltage through a load 6 so as to provide the load 6 with the output voltage Vout. The switching regulator 2 converts the input voltage Vin to a predetermined voltage to output from the output terminal OUT as an output voltage Vo1. The series regulator 3 converts the input voltage Vin to a predetermined voltage to output from the output terminal OUT as an output voltage Vo2.

The switching transistor M1 includes a PMOS transistor for controlling an output level of the input voltage Vin input to the input terminal IN. The switching transistor M2 includes a NMOS transistor for synchronization and rectification. The resistors R1 and R2 branch the output voltage Vout to generate and output a first branched voltage VFB1 for output voltage detection. The resistors R1 and R2 are included in a series circuit of which end is connected to the output terminal OUT. Another end of the series circuit is connected to a ground voltage under the control of the NMOS transistor M3. In other words, the NMOS transistor M3 controls the connection of the series circuit to the ground voltage.

The first reference voltage generation circuit 11 generates and outputs a first reference voltage Vr1 according to an input signal. The first error amplification circuit 12 amplifies and outputs a difference between the first branched voltage VFB1 and the first reference voltage Vr1. The triangular wave generation circuit 13 generates and outputs a predetermined triangular wave signal TW.

The PWM comparison circuit 14 compares an output voltage Ver from the first error amplification circuit 12 with the triangular wave signal TW from the triangular wave generation circuit 13, and generates and outputs a pulse signal Spw for controlling pulse width modulation so that a pulse width according to the output voltage Ver is obtained. The output control circuit 15 generates a control signal PD to drive the switching transistor M1, and generates a control signal ND to drive the switching transistor M2.

The first output current regulation circuit 16 detects a voltage drop when the switching transistor M1 is turned on, and causes the output control circuit 15 to turn off the switching transistors M1 and M2 when an output current from the switching transistor M1 exceeds a predetermined current. The soft-start circuit 17 gradually increases the first reference voltage Vr1 when the switching regulator 2 is started so that an excessive current does not flow into the switching transistor M1. The AND circuit 18 includes an input terminal in which a mode signal MODE is input from outside, and another input terminal in which a chip enable signal CE is input from outside.

The second reference voltage generation circuit 21 generates and outputs a predetermined second reference voltage Vr2. The resistors R3 and R4 branch the output voltage Vout to generate and output a second branched voltage VFB2 for output voltage detection. The resistors R3 and R4 are included in a series circuit, an end of series circuit is connected to the output terminal OUT. Another end of the series circuit is connected to a ground voltage under the control of the NMOS transistor M5. The NMOS transistor M5 controls the connection of the series circuit to the ground voltage. The output transistor M4 includes a PMOS transistor for controlling a current to be output to the output terminal OUT according to a signal input to a gate. The second error amplification circuit 22 controls operation of the output transistor M4 so that the second branched voltage VFB2 becomes equal to the second reference voltage Vr2. The second output current regulation circuit 23 controls operation of the output transistor M4 to regulate a current output from the output transistor M4 when the current becomes equal to or exceeds a predetermined value. The TR control circuit 24 controls operation of the NMOS transistor M5.

In the constant-voltage circuit 1, the above circuits except the smoothing inductor L1 and the condenser C1 of the switching regulator 2 are integrated into a single integrated circuit (hereinafter referred to as IC). The IC includes the input terminal IN, the output terminal OUT, an Lx terminal, a GND terminal, a MODE terminal, and a CE terminal. The GND terminal is connected to a ground voltage. The MODE terminal receives the mode signal MODE from outside. The CE terminal receives the chip enable signal CE from outside.

Although the load 6 is externally connected to the IC as shown in FIG. 2, the load 6 may be integrated into the IC when the load 6 includes an integratable circuit, and the mode signal MODE may include a selection signal.

In the switching regulator 2, the switching transistors M1 and M2 are serially connected between the input terminal IN and the ground voltage. A connection part of the switching transistors M1 and M2 is connected to the Lx terminal. The smoothing inductor L1 is arranged between the Lx terminal and the output terminal OUT, and is connected thereto. The condenser C1 is arranged between the output terminal OUT and a ground voltage, and is connected thereto. Further, a serial circuit including the resistors R1 and R2, and the NMOS transistor M3 is arranged between the output terminal OUT and the GND terminal, and is connected thereto. A connection part between the resistors R1 and R2 is connected to an inverting input terminal of the first error amplification circuit 12. The first reference voltage Vr1 is input to a non-inverting input terminal of the first error amplification circuit 12.

The output voltage Ver of the first error amplification circuit 12 is input to an inverting input terminal of a comparator included in the PWM comparison circuit 14. The triangular wave signal TW from the triangular wave generation circuit 13 is input to a non-inverting input terminal of the comparator. A pulse signal Spw from the PWM comparison circuit 14 is output to each of the output control circuit 15 and the first output current regulation circuit 16. The output control circuit 15 outputs the control signal PD for controlling switching of the switching transistor M1 through a gate of the switching transistor M1, and outputs the control signal ND for controlling switching of the switching transistor M2 through a gate of the switching transistor M2.

The first reference voltage generation circuit 11 receives a signal SS1 from the soft-start circuit 17, and generates and outputs the first reference voltage Vr1 according to the signal SS1. The AND circuit 18 outputs an output signal to each gate of the first reference voltage generation circuit 11, the first error amplification circuit 12, the triangular wave generation circuit 13, the PWM comparison circuit 14, the first output current regulation circuit 16, the soft-start circuit 17, and the NMOS transistor M3.

In the series regulator 3, the output transistor M4 is arranged between the input terminal IN and the output terminal OUT, and is connected thereto. Further, the resistors R3 and R4, and the NMOS transistor M5 are serially arranged between the output terminal OUT and the GND terminal, and are connected thereto. An inverting input terminal of the second error amplification circuit 22 receives the second branched voltage VFB2. An output terminal of the second error amplification circuit 22 is connected to a gate of the output transistor M4. The chip enable signal CE input to the CE terminal is input to each of the second reference voltage generation circuit 21, the second error amplification circuit 22, the second output current regulation circuit 23, and the TR control circuit 24.

The TR control circuit 24 receives the mode signal MODE, and further receives an operation completion signal SSE from the soft-start circuit 17. Further, the TR control circuit 24 is connected to a gate of the NMOS transistor M5 to control operation of the NMOS transistor M5 according to the chip enable signal CE and the operation completion signal SSE. Although the output voltage Vo1 is equal to the output voltage Vout, the output voltage Vo1 represents a target voltage output from the switching regulator 2, and is not necessarily equal to the output voltage Vout. Similarly, although the output voltage Vo2 of the series regulator 3 is equal to the output voltage Vout, the output voltage Vo2 represents a target voltage output from the series regulator 3, and is not necessarily equal to the output voltage Vout.

In a constant-voltage circuit 1 configured in accordance with the illustrated embodiment of the invention, when a level of the chip enable signal CE becomes low, a level of the output terminal of the AND circuit 18 becomes low regardless of the mode signal MODE. Also, when a level of the chip enable signal CE becomes low, the first reference voltage generation circuit 11, the first error amplification circuit 12, the triangular wave generation circuit 13, the PWM comparison circuit 14, the first output current regulation circuit 16, and the soft-start circuit 17 in the switching regulator 2 stop operating, and the NMOS transistor M3 is turned off and brought into a cutoff state. Further, when the first output current regulation circuit 16 stops operating, the output regulation circuit 15 also stops operating. As a result, the output of the control signals PD and ND is stopped.

Therefore, the switching transistors M1 and M2 are each turned off and brought into the cutoff state, thereby causing the switching regulator 2 to stop operating. Further, when the level of the chip enable signal CE becomes low, the second reference voltage generation circuit 21, the second error amplification circuit 22, the second output current regulation circuit 23, and the TR control circuit 24 in the series regulator 3 stop operating. Since the TR control circuit 24 stops operating, the NMOS transistor M5 is turned off and brought into the cutoff state. As a result, the output transistor M4 is turned off and brought into the cutoff state, and the series regulator 3 stops operating.

Next, when the level of the chip enable signal CE becomes high, the second reference voltage generation circuit 21, the second error amplification circuit 22, the second output current regulation circuit 23, and the TR control circuit 24 in the series regulator 3 start operating regardless of the mode signal MODE. The mode signal MODE selectively causes either the switching regulator 2 or the series regulator 3 to operate. The level of the mode signal MODE becomes high to cause the switching regulator 2 to operate, and becomes low to cause the series regulator 3 to operate. In other words, when the levels of the chip enable signal CE and the mode signal MODE are both high, the level of the AND circuit 18 becomes high, the first reference voltage generation circuit 11, and first error amplification circuit 12, the triangular wave generation circuit 13, the PWM comparison circuit 14, the first output current regulation circuit 16, and the soft-start circuit 17 start operating, thus the switching regulator 2 starts operating.

In the switching regulator 2, the switching transistor M1 performs a switching operation. When the switching transistor M1 is turned on, the smoothing inductor L1 is supplied with a current and, the switching transistor M2 is off. When the switching transistor M1 is turned off, the switching transistor M2 is turned on, and energy accumulated in the smoothing inductor L1 is released through switching transistor M2. The current generated at the time is smoothed by the condenser C1, and is output to the load 6 through the output terminal OUT. Further, the output voltage Vout output from the output terminal OUT is branched by the resistors R1 and R2 for detecting output voltages, and the first branched voltage VFB1 is input to the inverting input terminal of the first error amplification circuit 12.

When the output voltage Vout increases, the output voltage Ver of the first error amplification circuit 12 decreases, and a duration of a duty cycle of the pulse signal Spw from the PWM comparison circuit 14 becomes shorter. As a result, a period of time in which the switching transistor M1 is on becomes shorter, and the switching regulator 2 is controlled to reduce the output voltage Vo1. When the output voltage Vo1 of the switching regulator 2, the output voltage Ver of the first error amplification circuit 12 increases, and the duration of the duty cycle of the pulse signal Spw from the PWM comparison circuit 14 becomes longer. As a result, the period of time in which the switching transistor M1 is on becomes longer, and the switching regulator 2 is controlled so that the output voltage Vo1 has a value corresponding to the first reference voltage Vr1.

Figure 3:
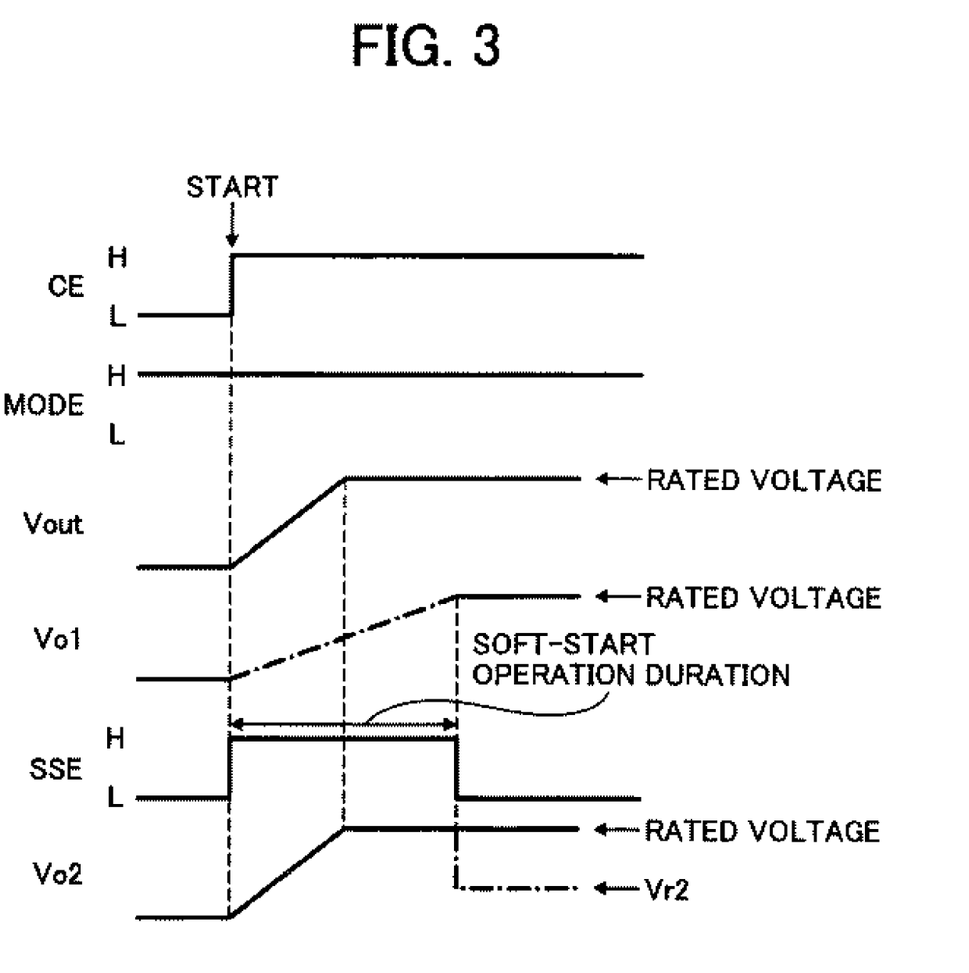
FIG. 3 is a timing chart illustrating waveforms of signals shown in FIG. 2.

FIG. 3 is a timing chart showing an exemplary waveform of each of the signals shown in FIG. 2. Operation of the soft-start circuit 17 is described in detail below referring to FIG. 3. Alternate long and short dashed lines indicate differences from the output voltage Vout as described before.

When the level of the mode signal MODE is high, and the chip enable signal CE shifts to the high level, a level of an output signal of the AND circuit 18 becomes high, and as described above, the switching regulator 2 starts operating.

When the switching regulator 2 starts operating, the soft-start circuit 17 starts operating. The soft-start circuit 17 gradually increases the first reference voltage Vr1 by using the control signal SS1 until the output voltage Vo1 shifts to a predetermined rated voltage. The output voltage Vo1 of the switching regulator gradually increases until the output voltage Vo1 becomes equal to the predetermined rated-voltage as indicated by the alternate long and short dashed line in order to gradually increase the first reference voltage Vr1. As described above, the soft-start circuit 17 ensures that excessive current does not flow into the switching transistor M1. When performing a soft-start operation, the soft-start circuit 17 keeps the operation completion signal SSE at a high level. When not performing the soft-start operation, the soft-start circuit 17 keeps the operation completion signal SSE at a low level.

The series regulator 3, on the other hand, starts operating when the level of the chip enable signal CE becomes high. In other words, when the switching regulator 2 is operating, the series regulator 3 is also operating. At the time, the TR control circuit 24 turns off the NMOS transistor M5 to bring into the cutoff state when the operation completion signal SSE is kept at the low level. Further, the level of the output signal of the AND circuit 18 becomes low, and the switching regulator 2 stops operating. In other words, when the level of the mode signal MODE becomes low, the TR control circuit 24 turns on the NMOS transistor M5 to bring the NMOS transistor M5 into conduction regardless of the operation completion signal SSE from the soft-start circuit 17.

Operation of the TR control circuit 24 is described in detail below.

The TR control circuit 24 turns on the NMOS transistor M5, as described above, regardless of the operation completion signal SSE from the soft-start circuit 17 when the level of the chip enable signal CE is high and the level of the mode signal MODE is low. Further, the TR control circuit 24 turns on the NMOS transistor M5 only in a case the operation completion signal SSE from the soft-start circuit 17 is at the high level when the level of the chip enable signal CE is high and the level of the mode signal MODE is high. Further, the TR control circuit 24 turns off the NMOS transistor M5 regardless of the operation completion signal SSE from the soft-start circuit 17 when the level of the chip enable signal CE is low.

In the series regulator 3, when the NMOS transistor M5 is on and conducting, the second error amplification circuit 22 amplifies a difference between the second reference voltage Vr2 and the second branched voltage VFB2, and outputs the difference to the gate of the output transistor M4 to control operation of the output transistor M4 so that the output voltage Vo2 becomes equal to the predetermined rated voltage. In other words, when r3 and r4 represent resistance values of the resistors R3 and R4, respectively, the output voltage Vo2 of the series regulator 3 is represented as follows:

$$Vo2 = Vr2 \times (r3 + r4)/r4 \qquad \text{(Equation 1)}$$

Further, in the series regulator 3, when the NMOS transistor M5 is turned off and brought into the cutoff state, the output voltage Vo2 becomes equal to the second reference voltage Vr2, which is smaller than the predetermined rated voltage.

The series regulator 3 starts operating immediately after the level of the chip enable signal CE becomes high; and as a result, the output voltage Vo2 satisfies Equation 1 above. Therefore, in the series regulator 3, a rise property of the output voltage Vout can be synchronized to a rise of the output voltage Vo2 of the series regulator 3 as shown in FIG. 3 since the condenser C1 connected to the output terminal OUT is charged with a current having a value regulated by the second output current regulation circuit 23 to raise the output voltage Vo2, and a time constant to be determined by the value of the current regulated by the second output current regulation circuit 23 and capacity of the condenser C1 is set such that the time constant is shorter than a duration of the soft-start operation. As a result, a length of time required for starting the constant-voltage circuit 2 can be reduced.

When the soft-start circuit 17 stops the soft-start operation, as the level of the operation completion signal SSE shifts from high to low, the TR control circuit 24 turns off the NMOS transistor M5. Although the output voltage Vo2 of the series regulator 3 becomes equal to the second reference voltage Vr2 as indicated by the alternate long and short dashed line shown in FIG. 3, since the output voltage Vout has been increased to the rated voltage by the output voltage Vo1 of the switching regulator 2, the level of the output signal of the second error amplification circuit 22 becomes high, and as a result, turns off the output transistor M4. In other words, the series regulator 3 does not output any current, and electric power is supplied to the load 6 only from the switching regulator 2.

Figure 4:
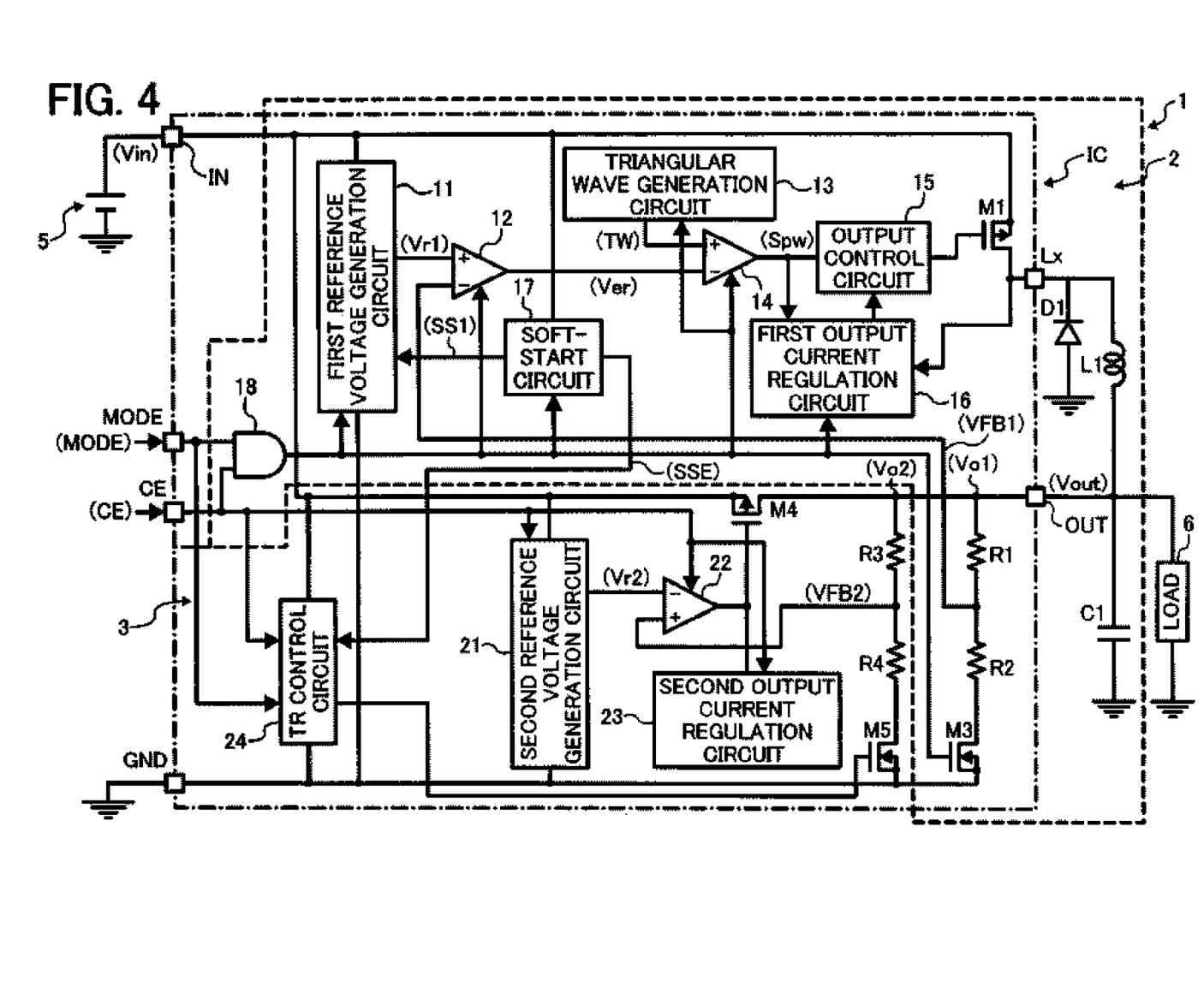
FIG. 4 is a diagram illustrating a configuration of the constant-voltage circuit according to another exemplary embodiment of the invention.

In another exemplary embodiment of the present invention, a flywheel diode D1 may be used as shown in FIG. 4 instead of the switching transistor M2 shown in FIG. 2. In FIG. 4, the same reference numeral as the reference numeral used in FIG.

2 represents the same component. Although the flywheel diode D1 is arranged outside the IC, the flywheel diode D1 is formed inside the IC when the flywheel diode D1 includes a diode suitable for integration, such as a PN junction type. The flywheel diode D1, the smoothing inductor L1, and the condenser C1 are included in a smoothing circuit unit.

As described above, in the constant-voltage circuit 1 according to an exemplary embodiment of the present invention, since the switching regulator 2 and the series regulator 3 are simultaneously activated on startup, and the output voltage Vout raises within a time period determined by the current regulated by the second output current regulation circuit 23 of the series regulator 3 and the time constant of the condenser C1 even when the soft-start circuit 17 takes a long operation period, the output voltage Vout can rise to the rated voltage in a short time. Further, since the switching regulator 2 raises the output voltage Vo1 by using the soft-start circuit 17, the switching transistor M1 can be prevented from receiving an excessive current. As a result, the output voltage can be safely risen in a short time.

The constant-voltage circuit 1 according to an exemplary embodiment of the present invention may be used in a semiconductor apparatus (not shown).

The above exemplary embodiments are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

What is claimed as new and desired to be protected by Letters Patent of the United States is:

1. A constant-voltage circuit, comprising:
   a common output terminal;
   a switching regulator operable to convert an input voltage to a rated voltage to be output at the common output terminal, the switching regulator including:
   a reference voltage generator, and
   a soft-start circuit connected to the reference voltage generator and operable to raise an output voltage of the reference voltage generator at a constant speed until the output voltage of the switching regulator has reached the rated voltage, wherein the soft-start circuitry and switching regulator are configured to start operating on receipt of a selection signal; and
   a series regulator connected to the soft-start circuit and operable to regulate a current so that an output current of the series regulator does not exceed a predetermined value and to convert the input voltage to the rated voltage to output to the common output terminal, the series regulator being configured to start operating simultaneously with the switching regulator on receipt of the selection signal and stop outputting a current to the output terminal on receipt of an operation completion signal from the soft-start circuit, and wherein the selection signal is input from outside the constant-voltage circuit for exclusively causing one of the switching regulator and the series regulator to operate.

2. The constant-voltage circuit according to claim 1, wherein the series regulator lowers a voltage to output to the output terminal when the operation completion signal is received.

3. The constant-voltage circuit according to claim 2, wherein the series regulator comprises:
   an output transistor configured to output a current according to an input control signal to the common output terminal from a common input terminal;
   a reference voltage generation circuit configured to generate and output a predetermined reference voltage;
   an output voltage detection circuit configured to detect a voltage at the common output terminal, and to generate and output a voltage commensurate with the detected voltage;
   an error amplification circuit supplied with a predetermined bias current configured to control operation of the output transistor so that the commensurate voltage becomes equal to the reference voltage output by the reference voltage generation circuit; and
   a control circuit configured to cause the voltage at the output terminal to be output to the output voltage detection circuit when the operation completion signal is received from the soft-start circuit.

4. The constant-voltage circuit according to claim 3, wherein a speed at which the series regulator raises an output voltage to the rated voltage on startup is higher than a speed at which the switching regulator raises an output voltage to the rated voltage on startup.

5. The constant-voltage circuit according to claim 4, wherein a speed at which the series regulator raises an output voltage to the rated voltage on startup is determined by the predetermined value for regulating a current.

6. The constant-voltage circuit according to claim 5, wherein the switching regulator comprises:
   a switching element configured to perform switching according to a control signal input to a control electrode to control an output of the input voltage;
   a switching control circuit configured to control the switching performed by the switching element so that a voltage output from the common output terminal becomes equal to a predetermined voltage, said switching control circuit including the reference voltage generator and soft-start circuit; and
   a smoothing circuit including a synchronization and rectification switching element serially connected to the switching element, of which switching is controlled by the switching control circuit, configured to smooth a voltage output from the switching element to output to the common output terminal, wherein the switching element, wherein the synchronization and rectification switching element, the switching control circuit, and the series regulator are integrated into a single integrated circuit (IC).

7. The constant-voltage circuit according to claim 5, wherein the switching regulator comprises:
   a switching element configured to perform switching according to a control signal input to a control electrode to control an output of the input voltage;
   a switching control circuit configured to control the switching performed by the switching element so that a voltage output from the common output terminal becomes equal to a predetermined voltage, said switching control circuit including the reference voltage generator and soft-start circuit; and
   a smoothing circuit configured to smooth a voltage output from the switching element and outputting the smoothed voltage to the output terminal, wherein the switching element, the switching control circuit, and the series regulator are integrated into a single IC.

8. The constant-voltage circuit according to claim 5, wherein the switching regulator comprises:
   a switching element configured to perform switching according to a control signal input to a control electrode to control an output of the input voltage;

a switching control circuit configured to control the switching performed by the switching element so that a voltage output from the common output terminal becomes equal to a predetermined voltage, said switching control circuit including the reference voltage generator and soft-start circuit; and a smoothing circuit including a flywheel diode serially connected to the switching element, configured to smooth a voltage output from the switching element to output to the common output terminal, wherein the switching element, the flywheel diode, the switching control circuit, and the series regulator are integrated into a single IC.

9. A semiconductor apparatus having a predetermined function, including a constant-voltage circuit, comprising:

a switching regulator operable to convert an input voltage to a rated voltage, the switching regulator including:

a reference voltage generator, and a soft-start circuit connected to the reference voltage generator and operable to raise an output voltage of the reference voltage generator at a constant speed until the output voltage of the switching regulator has reached the rated voltage, wherein the soft-start circuitry and switching regulator are configured to start operating on receipt of a selection signal; and a series regulator connected to the soft-start circuit and operable to regulate a current so that an output current of the series regulator does not exceed a predetermined value and to convert the input voltage to the rated voltage, the series regulator being configured to start operating simultaneously with the switching regulator on receipt of the selection signal and stop outputting a current on receipt of an operation completion signal output by the soft-start circuit when a soft-start operation is completed, and wherein the selection signal is input from outside for exclusively causing one of the switching regulator and the series regulator to operate.

10. The semiconductor apparatus according to claim 9, wherein the series regulator lowers a voltage to output when the operation completion signal is output.

11. A method of controlling a constant-voltage circuit including a function of performing a soft-start operation, comprising the steps of:

providing a soft-startable switching regulator, the switching regulator including a reference voltage generator and a soft-start circuit connected to the reference voltage generator operable to raise an output voltage of the reference voltage generator at a constant speed during a soft-start;

providing a series regulator connected to the soft-start circuit;

receiving a selection signal from an input to the constant-voltage circuit for exclusively causing one of the switching regulator and the series regulator to operate, the selection signal activating the soft-start circuit;

simultaneously activating the series regulator when the switching regulator starts operating; and causing the series regulator to automatically stop outputting a current to an output terminal on receipt of an operation completion signal output by the soft start circuit when the soft-start is completed.

12. The method of controlling the constant-voltage circuit according to claim 11, wherein a speed at which the series regulator raises an output voltage to a rated voltage on startup is higher than a speed at which the switching regulator raises an output voltage to the rated voltage on startup.

13. The method of controlling the constant-voltage circuit according to claim 12, wherein a speed at which the series regulator raises an output voltage to the rated voltage on startup is determined by a predetermined value for regulating a current.

* * * * *